United States Patent [19]

Wevelsiep

[11] Patent Number: 4,691,367
[45] Date of Patent: Sep. 1, 1987

[54] METHOD AND APPARATUS FOR OMNIDIRECTIONAL READING OF DATA BASES

[76] Inventor: Klaus Wevelsiep, Fuchstanzstrasse 11, 6239 Kriftel, Fed. Rep. of Germany

[21] Appl. No.: 632,544

[22] Filed: Jul. 19, 1984

[51] Int. Cl.⁴ .............................................. G06K 9/20
[52] U.S. Cl. ......................................... 382/61; 382/44
[58] Field of Search ....................... 382/61, 46, 44, 47, 382/65

[56] References Cited

U.S. PATENT DOCUMENTS

| 3,710,319 | 1/1973 | Miller et al. | 382/65 |
| 3,852,573 | 12/1974 | Dolch | 382/61 |
| 3,976,982 | 8/1976 | Eiselen | 382/44 |
| 4,267,573 | 5/1981 | Chaikin et al. | 382/47 |
| 4,403,339 | 9/1983 | Wevelsiep et al. | 382/44 |
| 4,424,587 | 1/1984 | Wevelsiep et al. | 382/46 |
| 4,589,144 | 5/1986 | Namba | 382/61 |

Primary Examiner—David K. Moore
Assistant Examiner—Jacqueline Todd
Attorney, Agent, or Firm—Wood, Herron & Evans

[57] ABSTRACT

A method and apparatus for omnidirectional reading of data fields is provided. Such data fields contain at least one data track containing contrasting printed indicia and a PIC pattern. The PIC pattern indicates the position and orientation of the data tracks. The data field appears at an image window which is scanned by an opto-electronic scanner operating in a point raster scan and individual raster point signals are generated which correspond to the light/dark values of the original image. The signals are stored as a corresponding image arranged in row and column form. A search raster then probes the stored image in a sequence of rows, but the rows of the search raster scan the stored image at a predetermined search angle relative to the rows of the stored image itself upon each pass of the search raster. The video signal produced by each pass of the search raster is examined for the presence or absence of the PIC pattern. Upon recognition of the PIC pattern, the orientation of the data tracks is determined and then the data field is read either in the direction of the data tracks or at right angles to them, and the information they contain is decoded.

14 Claims, 5 Drawing Figures

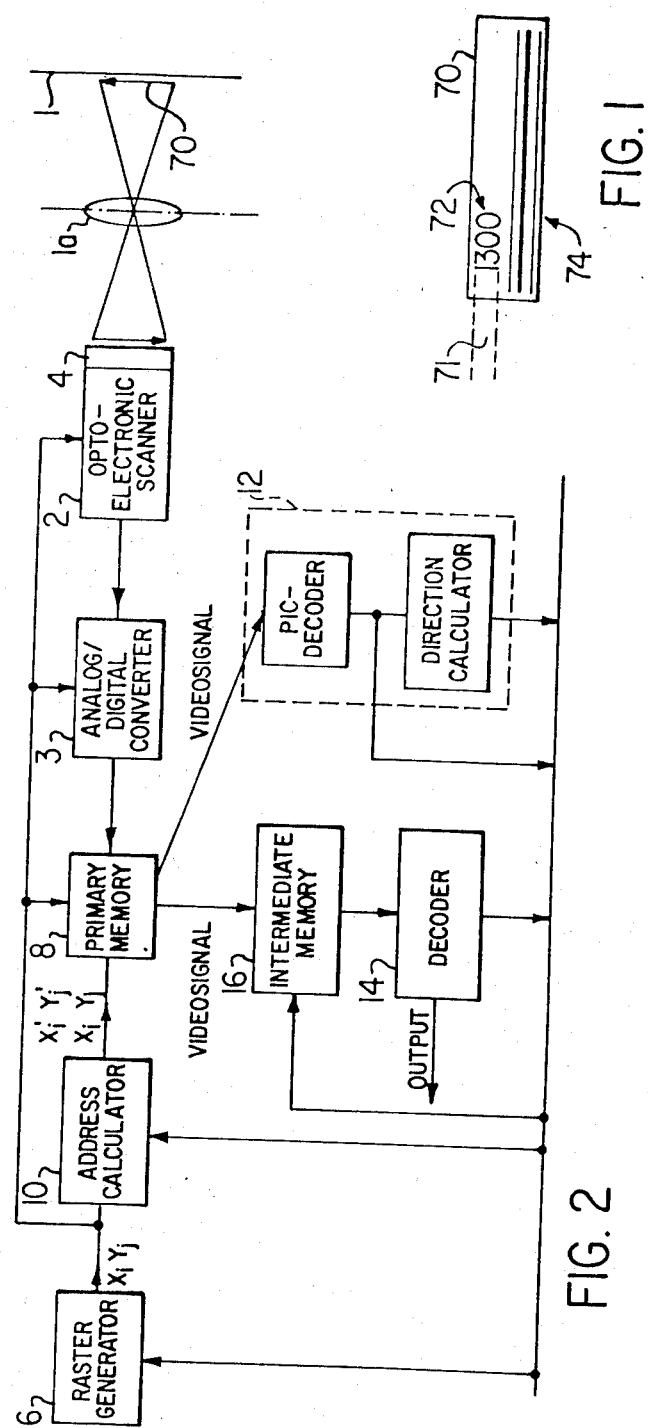

METHOD AND APPARATUS FOR OMNIDIRECTIONAL READING OF DATA BASES

RELATED APPLICATION

This application is a continuation of an International Application No. PCT/EP83/00303 filed Nov. 17, 1983 which is now abandoned.

DESCRIPTION

The invention relates to a process and apparatus for the identification of objects which appear at an image window at random positions and orientations and for random times and which have a data field containing contrasting indicia arranged in at least one data track, and at least one predetermined contrasting line pattern (PIC pattern). The PIC pattern indicates the position and orientation of the data track(s) and contains several lines with predetermined spacings and/or line widths. The image window is scanned opto-electronically by at least one point raster organised into rows and columns $(X_i, Y_j)$, $i=1 \ldots n$, $j=1 \ldots m$. At each raster point $(X_i, Y_j)$ a video raster point signal is produced $V_{ij}$ corresponding to the light/dark value encountered, and the video raster point signals are combined in a predetermined sequence to form a video signal. The position and the orientation of the data track(s) relative to the image window is determined by the appearance of a PIC pattern in the video signal corresponding to the PIC contrasting sequence. The information contained in the video signal is then decoded and the indicia contained in the data track(s) determined.

A method and apparatus of this kind is disclosed for example in DE-OS No. 29 42 757, in which, in a first method step (the search operation), the image window is scanned by a relatively widely spaced search raster at various search angles until the contrasting line pattern is recognized. In a second method step, the position and orientation of the data tracks relative to the image window are determined, and in a third method step (the reading operation), the image window is scanned with a closely spaced raster in the direction of the data tracks, and the indicia contained in the data tracks are read and decoded.

According to one aspect of the invention there is provided a process for the identification of objects which appear at an image window in random positions and orientations and for random times and which have a data field containing contrasting indicia in at least one data track and at least one predetermined contrasting line pattern (PIC-pattern) which indicates the position and orientation of the data track(s) and contains several lines of predetermined spacing and/or line width, which data track is opto-electronically scanned at the image window in at least one row and column organised point raster $(X_i, Y_j$ $i=1 \ldots n$, $j=1 \ldots m)$ and at each raster point $(X_i, Y_j)$ video raster point signals $V_{ij}$ are produced corresponding to the light/dark values of the scanned image points, whereupon the video raster point signals are assembled in a predetermined sequence of rows to form a videosignal, and the position and orientation of the data track(s) relative to the image window is determined upon the appearance of a PIC contrasting sequence in the videosignal corresponding to the PIC pattern(s), whereupon the information contained in the videosignal is then decoded and the indicia in the data track(s) determined; and wherein: (a) during each scanning of the point raster $(X_i, Y_j)$ the video raster point signals $V_{ij}$ corresponding to the original image are stored in a memory matrix made up of rows and columns; (b) a search raster arranged in rows and columns $(X_i, Y_j)$ is employed to scan and read the memory positions of the memory matrix once or several times and to produce a videosignal during each scan wherein the rows of the search raster and of the memory matrix upon each scan of the search raster cross each other at a predetermined search angle $\alpha_k$, $k=1, 2, 3 \ldots$; (c) the output videosignal is examined for the presence/absence of the PIC—contrasting sequence; (d) upon recognition of the PIC—contrasting sequence the angle $\alpha$ between the actual search direction (angle $\alpha_k$) and the data track, as well as the position of the data field within the memory image is determined from the corresponding address coordinates of the search raster, and the direction of the data track(s) (reading angle $\alpha = \beta + \alpha_k$ ($\pm 90°$)) with the memory matrix is calculated; and e) then the memory image is read and decoded with reading raster $(X_i', Y_j')$ arranged in rows and columns in the direction of, or at right angles to, the data track.

According to another aspect of the invention there is provided apparatus for the identification of objects having a data field containing contrasting indicia in at least one data track and at least one predetermined contrasting line pattern (PIC-pattern) which indicates the position and orientation of the data track(s) and contains several lines of predetermined spacing and/or line width, the apparatus recognizing the PIC contrasting sequence in the videosignal, and a decoder for decoding the information contained in the videosignal; and wherein: (a) the opto-electronic scanner has a sensor-diode arrangement which forms the point raster $(X_i, Y_j)$ and has a sensor diode at each raster point; (b) the raster generator simultaneously addresses the sensor diode arrangement and a primary memory and writes the video raster point signal $V_{ij}$ obtained from each addressed sensor diode into the addressed memory position for the production of a memory image; (c) an address calculator receives the address coordinates $(X_i, Y_j)$ supplied by the raster generator and a predetermined search angle $k$, $k=1, 2, 3$ and converts them into the address coordinates of the search raster $(x_i, y_j)$ and sequentially addresses the primary memory with the transformed address coordinates to produce a videosignal; (d) the videosignal from the primary memory is transferable to the PIC decoder; (e) the PIC decoder stores the corresponding address coordinates upon recognizing the PIC contrasting sequence, calculates the angle $\beta$ between the actual search direction (angle $\alpha_k$) and the data track from the stored address coordinates, and calculates the reading and $\rho = \beta + \alpha_k$ ($\pm 90°$) from the actual search angle $\alpha_k$ and the angle $\beta$; (f) the address calculator then repeats the addresses coordinates from the raster generator, and receives the reading angle $\rho$ from the PIC—decoder, transforms the address coordinates to the reading raster and addresses the primary memory sequentially with the transformed address coordinates; and (g) the videosignal from the primary memory obtained by the reading raster is led to the decoder.

The advantages of the invention are, in particular, that the omni-directional reading operation can be carried out by means of a stationary, i.e. neither mechanically nor electronically rotating, raster scan, e.g. by means of non-moving, matrix-form sensor diode arrangement. The opto-electronic image transformation can therefore be carried out in a relatively short time, and the search for the recognition of the PIC contrasting sequence can then take place upon repeated reading of the memory image at predetermined search angles without the opto-electronic scanner being activated. This reading of the memory image can take place at a special reading rate, whereby the flexibility of the method is improved.

Upon the reading of the memory image by the search raster, the primary memory, which contains the memory image, generates the video raster point signals stored in the individual memory positions in a predetermined sequence to produce a video signal. When the PIC contrasting sequence is detected in the video signal corresponding to at least two rows of the search raster, the address coordinates of the search raster corresponding to the PIC contrasting sequence are memorized so that from those coordinates the angle $\beta$ between the actual direction of the search raster and the direction of the data tracks, as well as the position and the direction of the data tracks in the memory image, can be determined. Advantageously, no additional number coordinate raster needs to be generated for the calculation of this essential information.

Preferably, the videosignal produced by the search raster is stored in a "normal position" in an intermediate memory in such a way that the succession of video raster point signals of the individual rows or columns of the reading raster are written into the rows or columns of a two dimensional memory matrix. It is especially preferred that the reading raster can, as a result of this intermediate memorizing, be limited to a region corresponding to the data field. For this purpose, the size of the data field must be determined during preceding search operation. A subsequent reading out of the data field from the intermediate memory for decoding is thereby simplified.

Preferably, the contrasting line pattern (PIC pattern) consists of several parallel, straight lines with predetermined spacings and line widths. If, in the case of such a PIC pattern, the row or column direction of the point raster of the opto-electronic scanner varies e.g. by a relatively small angle from the direction of lines of the PIC pattern (or from the direction of the bars of a bar code), a memory image is produced in which the individual lines possess step-wise edges because, in the memory, the dark regions of the lines can be depicted only as discreet widths corresponding to the width of the rows of the point raster of the opto-electronic scanner. Multi-stepped edge zones of the lines of the PIC pattern, or a bar code (or other symbols), give rise to slight recognition or reading errors during recognition of the PIC contrasting sequence in the video signal or upon decoding of the information in the bar code.

According to a particularly preferred embodiment of the invention such recognition or reading errors are eliminated in that the opto-electronic scanner contains several stationary sensor diode matrixes made up of rows and columns, which are arranged in a single plane and have predetermined angular packing arrangements relative to each other. The image field is then scanned as a point raster by all of the diode matrixes, preferably one after the other, and the video point raster signals $V_{ij}$ from each matrix are used to form memory images in different regions of a primary memory or in different primary memories. Advantageously, the memory image having the smallest recording error is then chosen for the further process steps, i.e. the reading by the search raster at various search angles until the PIC contrasting sequence is recognized and then the reading a decoding of the memory image by the reading raster.

As a suitable criterium for the choice of one of the several memory images, the number of stored video raster point signals having dark values may be used, that is a quantity which is integral for the memory image is produced upon storage of the image.

Alternatively, all of the memory images may be read in succession by one and the same search raster and the memory image giving the most accurate PIC contrasting pattern determined. Then the memory image determined in this way is processed further in accordance with the invention. It is possible in this way to reduce the inevitable image recording errors produced upon the generation of memory images by an image transformation process employing discreet image measurement points. Besides, a relatively large sensor diode matrix with a predetermined minimum resolution (e.g. 1000×1000 pixel) may be replaced by several smaller sensor diode matrixes (e.g. 4 diode matrixes each with 500×500 pixel), which together can be provided at a substantial price saving.

Further advantageous forms of the invention are characterized by the features of the following claims.

A preferred embodiment of the invention is described in the following with reference to the accompanying drawings, in which:

FIG. 1 shows an example of a data field with a contrasting line pattern and a data track;

FIG. 2 shows a simplified block diagram of the apparatus according to the invention;

Figure 3:
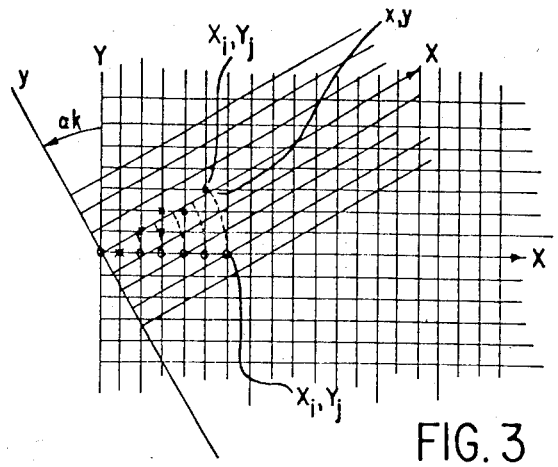
FIG. 3 shows an enlarged schematic representation of the step of addressing the primary memory image with the search raster.

FIG. 1 shows a data field 70, e.g. a price sticker or the like, which has contrasting indicia 72 arranged in a data track 71 for identifying the goods to which the data field is attached. The contrasting indicia may be, for example, alphanumeric symbols of a machine readable type face, e.g. OCR-A symbols or OCR-B symbols. Alternatively, the indicia may be a known bar code.

A contrasting line pattern 74 is provided in a predetermined position and with a predetermined orientation relative to the data track 71. In the following, this is referred to as the position identification code pattern or PIC pattern, and consists of several contrasting lines, which in the example shown extend parallel to each other and have different spacings and line widths. The contrasting line pattern 74 can be located at the beginning or end of the data track 71 instead of below it. Alternatively, there may be several contrasting line patterns and several data tracks. The contrasting line pattern 74 is asymmetric in the direction at right angles to the contrasting lines so that it can unambiguously indicate the beginning and end of the data tracks, and the reading direction being carried out as compared with the usual left to right reading direction of the printed indicia.

Although only one PIC pattern with three lines is shown, PIC patterns with more than three lines may be employed. Further, the PIC pattern may be used in a different position and orientation relative to the data tracks. In the embodiment shown, the length of the PIC pattern essentially also indicates the length of the data field. The specially chosen sequence of contrasting lines may also contain information about the size of the data field.

FIG. 2 shows a simplified block circuit diagram of the apparatus. A data field 70 as shown in FIG. 1, which may be attached for example to a container, goods of some kind, an industrial part or the like, appears at a random position and orientation at an image window 1 and is scanned by an opto-electronic scanner 2 via a lens system 1a. The target of the scanner is formed by at least one matrix comprising rows and columns of sensor diodes. Such a diode matrix 4 has for example n-columns $X_i$, $i = 1 \ldots n$, which are all arranged next to each other in the X-direction. The diodes are also arranged in m-rows $Y_j$, $j = 1 \ldots m$, which all lie next to each other in the Y direction. The diodes of the diode matrix 4 thus form a positionally fixed point raster ($X_i$, $Y_j$) $i = 1 \ldots n$, $j = 1 \ldots m$, arranged in rows and columns, by means of which the image window 1 is scanned. Each diode at raster point $X_i$, $Y_j$ illuminates a corresponding image point of the image window 1 and generates a video raster point signal $V_{ij}$ which corresponds to the light or dark value of the illuminated image point, and the signal is delivered to the output of the opto-electronic scanner 2.

A raster generator 6 is provided so that the image window 1 can be scanned as a point raster ($X_i$, $Y_j$) by the diode matrix 4 and converted to corresponding video raster point signals $V_{ij}$. The raster point generator 6 produces the address coordinates $X_i$, $Y_j$ corresponding to the raster points $X_i$, $Y_j$ and activates or addresses the raster points $X_i$, $Y_j$ with these address coordinates. The raster points $X_i$, $Y_j$ so addressed, i.e. the corresponding diodes $D_{ij}$, then produce the corresponding video raster point signals which correspond to the light/dark values detected at the equivalent image points of the data field.

Each raster point signal $V_{ij}$ is transformed into a digital raster point signal $V_{ij}$ in an analog/digital converter. Each resulting signal contains information about the light/dark value of the corresponding image point.

The digital raster point signal $V_{ij}$ is led to a primary memory 8 comprising a memory matrix arranged in rows and columns with the address coordinates $X_i$, $Y_j$ corresponding to the point raster $X_i$, $Y_j$. Simultaneously with the addressing of the raster points $X_i$, $Y_j$, the corresponding memory positions $X_i$, $Y_j$ are addressed, in which the digital raster point signals $V_{ij}$ from the raster point $X_i$, $Y_j$ are stored. In the embodiment shown, the primary memory thus works with the same address coordinates $X_i$, $Y_j$ as the diode matrix 4 contained in the opto-electronic scanner 2. This means that the data field 70 within the image window 1 perceieved by the diode matrix is "portrayed" as an image, i.e. without rotation or translation, in the primary memory, and is stored there as a "stored image" in the relative position perceived by the diode matrix.

The primary memory 8 is then read repeatedly by a search raster operating in a series of rows. The rows of the search raster, upon each pass, cuts across the rows or columns of the primary memory at a predetermined search angle $\alpha_k$, $k = 1,2,3, \ldots$ To achieve this, the raster generator 6 regenerates the address coordinates $X_i$, $Y_j$ and these are subjected to an address transformation in an address calculator 10, i.e. a rotation of the address coordinates to the search angle $\alpha_k$. The address coordinates of the search raster $X_i$, $Y_j$ are obtained from a rotation of the address coordinates $X_i$, $Y_j$ of the point raster or the primary memory. However, since the memory positions are located at discreet points, the calculated address coordinates of the search raster undergo an interpolation process, e.g. the "nearest neighbour interpolation" to select those memory positions which, in each case, have the addresses $x_i$, $y_j$ lying closest to calculated values $x$, $y$:

$$x = X_i \cos \alpha_k + Y_j \sin \alpha_k$$

$$y = X_i \sin \alpha_k + Y_j \cos \alpha_k \qquad (1)$$

(see in particular FIG. 3).

A suitable interpolation process for locating physically existing memory positions, $x_i$, $y_j$ consists of the usual algebraic approximation of the calculated values $x$, $y$ obtained from the transformation equations (1). If for example the calculation result is obtained with 20 bits, 10 bit long input values for $X_i$, $Y_j$ are suitable and the result is rounded to 10 bits. This approximation is anyway necessary, since the "rotated" address coordinates X, Y likewise may have only the same bit length as the unrotated address co-ordinates. This process, the so-called "nearest neighbour interpolation" process, has the disadvantage that the transformation of a memory position can be in error by one memory position in each coordinate direction, whereby a previously straight line contour, e.g. a row of the memory matrix of the primary memory, may be irregular after the rotation, as shown in FIG. 3. The error generated in this way is reduced as the dimensions of the pixels (single diodes) within the diode matrix are reduced with respect to the contours reproduced.

A partial correction of the unavoidable errors produced by the address coordinates transformation is possible in that, before the transformation of the addresss $X_i$, $Y_j$, the vicinity of this address is examined and the positional vectors from the considered address $X_i$, $Y_j$ to the eight nearest neighboring addresses is temporarily memorized. After the rotation to the search angle $\alpha_k$, these neighbouring relationships must be preserved, provided there is no error. As a result of the point nature of the stored address coordinates these however are likewise subject to approximation error, that is the previously memorized neighbour relations are similarly disrupted. The necessary correction algorithm must now be so effected that the neighbouring relationships determined by the memorized positional vectors are disturbed as little as possible. On the basis of the calculation time, such a correction during the determination of the adress coordinates of the search raster or the reading raster is only possible in hardware.

The reading out of the stored image by means of the search raster $x_i$, $y_j$ takes place as a sequence of memory places arranged in rows so that, at the output of the primary memory 8, a video signal is produced which contains the digital video raster point signals from the primary memory in the addressed sequence of rows. The resulting video signal is fed to a PIC-decoder 12 which examines the video signal for the presence or absence of the PIC contrasting sequence. A PIC decoder 12 known from our Canadian Pat. No. 1,151,299 issued on Aug. 2, 1983 then examines, by the delta-distance process, whether the PIC contrasting sequence appears in the individual rows of the video signal.

Figure 4:
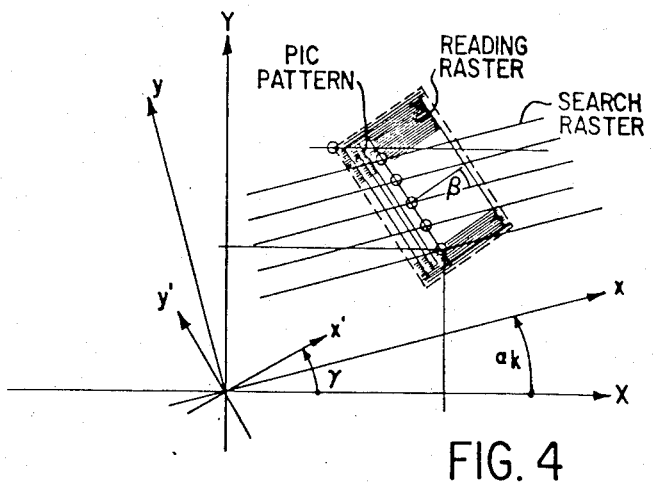
FIG. 4 shows a schematic representation of the operations taking place in the primary memory of the apparatus.

If the PIC contrasting sequence(s) is recognized in the row divisions of the videosignal by the PIC decoder 12, and generally in at least two suitably separated row divisions of the search raster, the address coordinates of the search raster corresponding to the PIC contrasting sequence within the videosignal are temporarily stored in the PIC decoder 12 and the angle $\beta$ between the actual search direction, which is a function of the search angle $\alpha_k$, and the direction of the PIC pattern or the contrasting lines is determined (see FIG. 4). From the actual search angle $\alpha_k$ and the determined angle $\beta$, the direction of the data track(s), or a direction at right angles to it, is calculated (the so called reading direction of the memory image). This direction is defined by the reading angle $\rho = \alpha_k + \beta(\pm 90°)$.

Figure 5:
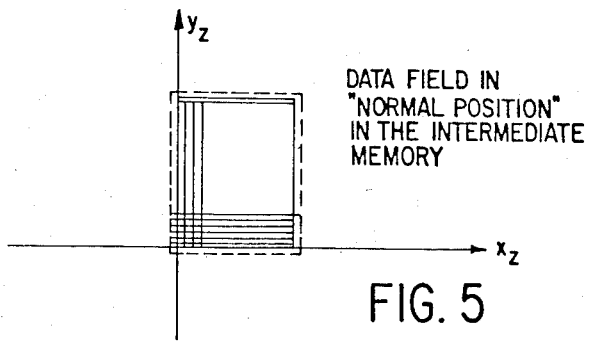
FIG. 5 shows a schematic representation of the imaging of the data field in the intermediate memory of the apparatus.

The memory image in the primary memory 8 is then read out in the reading direction by means of a row and column reading raster and raster point signal after raster point signal is fed into an intermediate memory 16 arranged in rows and columns, whereby the successive raster point signals from the rows or columns of the reading raster are stored in the successive memory places of the rows or columns of the intermediate memory 16, so that a memorized image rotated to the reading angle $\rho$ is stored in the intermediate memory (see FIG. 5).

To enable the intermediate memory 16 to be kept small, the position of the data field within the memory image is also determined upon recognition of the contrasting line sequence in the video signal and calculation of the reading angle, and the corner coordinates of the data field within the search raster coordinates are determined. The reading raster is then limited to a region of the memory image corresponding to the data field (see FIG. 4).

According to FIG. 5, the data field is stored in the intermediate memory 16 in its normal position. For this purpose, besides the rotation of the raster to the reading angle $\rho$, an additional coordinate transformation is carried out in such a manner that the chosen corner of the data field is transformed to become the origin of the memory matrix of the intermediate memory 16. All other address coordinates of the reading raster are correspondingly transformed (see FIGS. 4 and 5).

The decoder 14 reads the data field memorized in the normal position in the intermediate memory 16 according to the decoder-algorithm, decodes the information contained in this way and delivers the decoded information to its output. A suitable decoder for decoding OCR symbols is disclosed, for example, in our copending Canadian Patent Application Ser. No. 375,539 filed on Apr. 15, 1981. By means of this decoder 14, the individual regions corresponding to the separate indicia are read and decoded. The individually decoded symbols are then delivered to the output of decoder 14 to a display or for further utilization.

The diode matrix 4 can be made up of several individual diode matrixes, all arranged in one plane. In order to make the reproduction error caused by the point nature of the sensor equipment as small as possible, the individual diode matrixes may have a predetermined angular packing arrangement and each form a representation of the image window 1 in a separate primary memory. The search operation for locating the PIC pattern is then carried out either only on the memory image with the smallest imaging errors or in sequence on the individual memory images, in order to determine as accurately as possible the position and orientation of the PIC pattern in the memory image. The reading operation, i.e. the reading out of a memory image by means of a reading raster, then takes place only on the memory image which has the smallest reproduction errors or on the one in which the PIC pattern can be most clearly recognized. The transfer of the stored image into the intermediate memory 16 and the decoding of the information stored in the intermediate memory by means of the decoder 14 then takes place in the manner already described.

I claim:

1. A process for the identification of objects which appear at an image window in random positions and orientations and for random times and which have a data field containing contrasting indicia in at least one data track and at least one predetermined contrasting line pattern (PIC-pattern) which indicates the position and orientation of the data track(s) and contains several lines of predetermined spacing and/or line width, which data track is opto-electronically scanned at the image window in at least one row and column organized point raster $(X_i, Y_j\ i=1 \ldots n, j=1 \ldots m)$ and at each raster point $(X_i, Y_j)$ video raster point signals $V_{ij}$ are produced corresponding to the light/dark values of the scanned image points, whereupon the video raster point signals are assembled in a predetermined sequence to form a videosignal, and the position and orientation of the data track(s) relative to the image window is determined upon the appearance of a PIC contrasting sequence in the videosignal corresponding to the PIC pattern(s), whereupon the information contained in the videosignal is then decoded and the indicia in the data track(s) determined; and wherein:

(a) during each scanning of the point raster $(X_i, Y_j)$ the video raster point signals $V_{ij}$ corresponding to the original image are stored in a memory matrix made up of rows and columns;

(b) a search raster arranged in rows and columns $(X_i, Y_j)$ is employed to scan and read the memory positions of the memory matrix once or several times and to produce a videosignal during each scan wherein the rows of the search raster and of the memory matrix upon each scan of the search raster cross each other at a predetermined search angle $\alpha_k$, $k = 1, 2, 3 \ldots$;

(c) the output videosignal is examined for the presence/absence of the PIC—contrasting sequence;

(d) upon recognition of the PIC—contrasting sequence the angle $\beta$ between the actual search direction (angle $\alpha_k$) and the data track, as well as the position of the data field within the memory image is determined from the corresponding address coordinates of the search raster, and the direction of the data track(s) (reading angle $\rho = \beta + \alpha_k(\pm 90°)$) with the memory matrix is calculated;

(e) then the memory image is read and decoded with reading raster $(X'_i, Y'_j)$ arranged in rows and columns in the direction of, or at right angles to, the data track, and (f) the address coordinates of the search raster $(x_i, y_j)$ are produced from a coordinate rotation of the address coordinates of the memory positions $(X_i, Y_j)$ followed by an interpolation, by which the actual memory positions addresses of the memory image nearest to rotated address coordinates are selected.

2. A process according to claim 1 wherein the videosignal obtained from the scanning in the direction of or at right angles to the data track(s) is temporarily stored as rows and columns in an intermediate memory and is then fed out of the intermediate memory to a decoder.

3. A process according to claim 1 or 2 wherein the reading raster reads only the region of the memory image corresponding to the data field.

4. Apparatus for the identification of objects having a data field containing contrasting indicia in at least one data track and at least one predetermined contrasting line pattern (PIC-pattern) which indicates the position and orientation of the data track(s) and contains several lines of predetermined spacing and/or line width, the apparatus having a raster generator, which generates and produces the address coordinates of the point raster of an opto-electronic scanner, a PIC decoder for recognizing the PIC contrasting sequence in the videosignal, and a decoder for decoding the information contained in the videosignal; and wherein;

(a) the opto-electronic scanner has a sensor-diode arrangement which forms the point raster $(X_i, Y_j)$ and has a sensor diode at each raster point;

(b) the raster generator simultaneously addresses the sensor diode arrangement and a primary memory and writes the video raster point signal $V_{ij}$ obtained from each addressed sensor diode into the addressed memory position for the production of a memory image;

(c) an address calculator receives the address coordinates $(X_i Y_j)$ supplied by the raster generator and a predetermined search angle $\alpha_k$, k=1, 2, 3 and transforms them into the address coordinates of the search raster $(x_i, y_j)$ and sequentially addresses the primary memory with the transformed address coordinates to produce a videosignal;

(d) said apparatus including means for transferring the videosignal from the primary memory to the PIC decoder;

(e) the PIC decoder includes means for storing the corresponding address coordinates upon recognizing the PIC contrasting sequence, means for calculating an angle $\beta$ between the search angle $\alpha_k$ and the data track from the stored address coordinates, and means for calculating a reading angle $\rho$ from the actual search angle $\alpha_k$ and the angle $\beta$ where $\rho = \beta + \alpha_k(\pm 90°)$).

(f) the address calculator includes means for repeating the address coordinates from the raster generator, means for receiving the reading angle $\rho$ from the PIC—decoder, means for transforming the address coordinates to the reading raster and addressing the primary memory sequentially with the transformed address coordinates; and (g) means for leading the videosignal obtained from the primary memory by the reading raster to the decoder.

5. Apparatus according to claim 4 wherein an intermediate memory is provided before the decoder which stores the videosignal from the primary memory in a row and column organized memory matrix, whereby successive memory positions of the intermediate memory matrix are occupied by successive video raster point signals from the primary memory.

6. Apparatus according to claim 4 wherein the form and/or arrangement of the PIC pattern determines the size and form of the data field, the PIC decoder calculates the corner coordinates of the data field upon the recognition of the PIC contrasting sequence from the corresponding address coordinates of the search raster, and the reading raster from the raster generator and the address calculator can be limited to the size of the data field.

7. Apparatus according to any one of claims 4 to 6, wherein the region of the primary memory read by the reading raster can be written into the intermediate memory, and that one of the corners of the data field is entered at the origin $(X_Z=0, Y_Z=0)$ of the intermediate memory.

8. Apparatus according to any one of claims 4 to 6, wherein the address calculator individually subjects the address coordinates of the raster generator to a coordinate rotation by a predetermined angle (actual search angle $\alpha_k$ or reading angle $\rho$) and then chooses the nearest existing coordinates in the primary memory to the calculated values and generates these as transformed address coordinates.

9. Apparatus according to any one of claims 4 to 6 wherein the sensor diode arrangement is formed as a stationary diode matrix made up of rows and columns.

10. Apparatus according to any one of claims 4 to 6, wherein the sensor diode arrangement contains a diode row, and an optical arrangement is provided which optically deflects the diode row in the column direction be a series of steps according to progressive increasing row coordinate signals generated by the raster generator, and generates the point raster.

11. Apparatus according to claim 4 wherein the sensor diode arrangement contains several stationary row and column-form diode matrixes which have a predetermined angular packing relative to each other, and each forms a point raster $(X_i, Y_j)$ and the video point raster signal $V_{ij}$ produced by each point raster is stored in an assigned region of the primary memory as a stored image, and that the individual stored images are separately further evaluated.

12. Apparatus according to claim 11, wherein the individual memory regions of the primary memory are individually addressed by means of the search raster until the PIC decoder reliably detects the PIC contrasting sequence in the videosignal, and then only that region of the primary memory is read by the reading raster in which the PIC contrasting sequence was recognized in the videosignal.

13. A process for the identification of objects which appear at an image window in random positions and orientations and for random time and which have a data field containing contrasting indicia in at least one data track and at least one predetermined contrasting line pattern (PIC-pattern) which indicates the position and orientation of the data track(s) and contains several lines of predetermined spacing and/or line width, which data track is opto-electronically scanned at the image window in at least one row and column organized point raster $(X_i, Y_j i=1 \ldots n, j=1 \ldots m)$ and at each raster point $(X_i, Y_j)$ video raster point signals $V_{ij}$ are produced corresponding to the light/dark values of the scanned image points, whereupon the video raster point signals are assembled in a predetermind sequence to form a videosignal, and the position and orientation of the data track(s) relative to the image window is determined upon the appearance of a PIC contrasting sequence in the videosignal corresponding to the PIC pattern(s), whereupon the information contained in the videosignal is then decoded and the indicia in the data track(s) determined; and wherein;

(a) during each scanning of the point raster $(X_i, Y_j)$ the video raster point signals $V_{ij}$ corresponding to the original image are stored in a memory matrix made up of rows and columns;

(b) a search raster arranged in rows and columns ($X_i$, $Y_j$) is employed to scan and read the memory positions of the memory matrix at least once and to produce a videosignal during each scan wherein the rows of the search raster and of the memory matrix upon each scan of the search raster cross each other at a predetermined search angle $\alpha_k$, $k=1, 2, 3 \ldots$;

(c) the output videosignal is examined for the presence/absence of the PIC—contrasting sequence;

(d) upon recognition of the PIC—contrasting sequence the angle $\beta$ between the actual search direction (angle $\alpha_k$) and the data track, as well as the position of the data field within the memory image is determined from the corresponding address coordinates of the search raster, and the direction of the data track(s) (reading angle $\rho = \beta + \alpha_k(\pm 90°)$) within the memory matrix is calculated;

(e) then the memory image is read and decoded with reading raster ($X'_i$, $Y'_j$) arranged in rows and columns in the direction of, or at right angles to, the data track; and (f) wherein the address coordinates of the search raster ($X_i$, $Y_j$) are produced from a coordinate rotation of the address coordinates of the memory positions ($X_i$, $Y_j$) followed by an interpolation by which the actual memory addresses of the memory image nearest to the rotated address coordinates are selected.

14. Apparatus for the identification of objects having a data field containing contrasting indicia in at least one data track and at least one predetermined contrasting line pattern (PIC-pattern) which indicates the position and orientation of the data track(s) and contains several lines of predetermined spacing and/or line width, the apparatus having an opto-electronic scanner having a point raster for generating a videosignal, a raster generator which generates and produces the address coordinates of the point raster of the opto-electronic scanner, a PIC decoder for recognizing the PIC contrasting sequence in the videosignal, and a decoder for decoding the information contained in the videosignal; and wherein:

(a) the opto-electronic scanner has a sensor-diode arrangement which forms the point raster ($X_i$, $Y_j$) and has a sensor diode at each raster point;

(b) the raster generator adapted to simultaneously addresses the sensor diode arrangement and a primary memory and to write the video raster point signal $V_{ij}$ obtained from each addressed sensor diode into the addressed memory position for the production of a memory image;

(c) an address calculator adapted to receive the address coordinates ($X_i$ $Y_j$) supplied by the raster generator and further adapted to transform them into the address coordinates of the search raster ($x_i$, $y_j$) by subjecting the address coordinates produced by the raster generator to a coordinate rotation by a predetermined angle to produce a set of calculated coordinates and selecting as transformed coordinates, the locations in the primary memory nearest the calculated coordinates and further adapted to sequentially addresses the primary memory with the transformed address coordinates to produce a videosignal;

(d) said apparatus including means for transferring the videosignal from the primary memory to the PIC decoder;

(e) the PIC decoder includes means for storing the corresponding address coordinates upon recognizing the PIC contrasting sequence and means for calculating an angle $\beta$ between the search angle $\alpha_k$ and the data track from the stored address coordinates, and means for calculating a reading angle $\rho$ from the search angle $\alpha_k$ and the angle $\beta$ where $\rho = +\alpha_k(\pm 90°)'$ (f) the address calculator includes means for then repeating the address coordinates from the raster generator, means for receiving the reading angle $\rho$ from the PIC decoder, means for transforming the address coordinates to the reading raster and means for addressing the primary memory sequentially with the transformed address coordinates; and (g) means for leading the videosignal obtained by the reading master from the primary memory to the decoder.

* * * * *